Aug. 12, 1969 D. H. NAVON ET AL 3,461,436

MATRIX-TYPE, PERMANENT MEMORY DEVICE

Filed Aug. 6, 1965 2 Sheets-Sheet 1

INVENTORS
David H. Navon,
David Bakalar
BY, Wolf, Greenfield & Hieken
ATTORNEYS

Aug. 12, 1969 D. H. NAVON ET AL 3,461,436

MATRIX-TYPE, PERMANENT MEMORY DEVICE

Filed Aug. 6, 1965 2 Sheets-Sheet 2

INVENTORS
David H. Navon,
BY, David Bakalar
Wolf, Greenfield & Hieken
ATTORNEYS

United States Patent Office 3,461,436

Patented Aug. 12, 1969

3,461,436

MATRIX-TYPE, PERMANENT MEMORY DEVICE

David H. Navon, West Peabody, and David Bakalar, Boston, Mass., assignors to Transitron Electronic Corporation, Wakefield, Mass., a corporation of Delaware Filed Aug. 6, 1965, Ser. No. 477,849
Int. Cl. G11b 3/00
U.S. Cl. 340—173 15 Claims

ABSTRACT OF THE DISCLOSURE

A memory device is formed with a base sheet of dielectric material. A plurality of elongated, parallel, conductive members are arranged in two groups extending angularly to each other to form crossover points, with the dielectric material interposed between the two groups. The dielectric material intermediate the groups is formed of a plurality of layers with one layer of uniform thickness and unperforated at the crossover points; and the second layer integral with the first having apertures at selected ones of the crossover points.

The present invention relates to a means and a method of forming integrated thin film permanent memory devices. The present invention is described with specific reference to an integrated thin film capacitor read-only, memory device and a method of making the same, although the principles herein described may be used in connection with means and methods of making other types of integrated thin film memory devices.

There is a constant demand for improved memory devices or components for use in computers and other comparable equipment. Devices which have been developed heretofore have inherent limitations in respect to their utility. For example, toroidal shaped, wire wound, inductance cores are laborious to make and are relatively expensive. Permanent memory devices of the capacitor read-only type have been fabricated heretofore but these devices are also laboriously made, are expensive or have significant limitations particularly in respect to noise protection and magnitude of capacitance per bit. Such devices are usually discretely assembled with capacitors connected to address or sense lines in the unit. Some memory devices are of a cryogenic variety which make use of the zero resistance of the metal conductive members at temperatures approaching absolute zero and of the finite resistance of the metal members when a small magnetic field takes the material out of the super-conducting state. Such devices are limited in utility because of the requirement of relatively sophisticated temperature control devices.

The present invention is designed to provide an improved integrated thin film permanent memory device, and a method of making the same. This invention provides a means and method of producing permanent memory devices in batch quantities at relatively low costs, using techniques which are simple and, in some instances, adaptations of well known and well understood procedures. A further object of this invention is to provide an improved capacitor read-only type memory device in which the cost-per-information bit is relatively inexpensive in comparison with the cost of presently available permanent memory devices.

A further object of this invention is to provide a relatively inexpensive permanent memory device which may be fabricated to individual needs, and which may be used in an operation in which customer orders for specifically designed memory devices can be filled rapidly and inexpensively regardless of the variety and quantity of memory devices required, and without the need of stocking specific standard devices.

A further object of the present invention is to provide a low-cost, relatively large memory array containing many thousands of bits of information in a small area which array may be made to order at a relatively low cost.

A further object of this invention is to provide a capacitive memory arrangement having greater noise protection and magnitude of capacitance per unit dimension than heretofore possible.

A further object of this invention is to provide a memory device that is adapted to be fabricated with integral connections for insertion in computers and other comparable machines whereby address lines and sense lines may be automatically and efficiently connected respectively to corresponding inputs and sense amplifiers.

A further object of this invention is to provide a method of fabricating memory devices having the advantages and features herein described.

In the present invention there is provided a memory device and method in which the device is preferably of the capacitor, read-only permanent memory type. This memory device includes first and second means, each preferably comprising a plurality of elongated conductive members, respectively forming addressing and sensing means, with the members of one group extending in a direction angular to the other group and forming a plurality of cross-over points which are spaced apart by dielectric means. Lumped impedances of different selected values are formed at different cross-over points in accordance with the memory characteristics desired. These lumped impedances are preferably in the form of capacitive elements or couplings at the cross-over points with these capacitive elements formed by variations in the thickness of the dielectric spacing at the cross-over points.

These and other objects and advantages of the present invention will be more clearly understood from consideration of the accompanying drawings in which.

Figure 5:
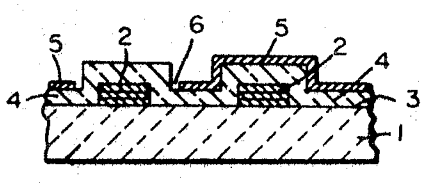
Figure 7:
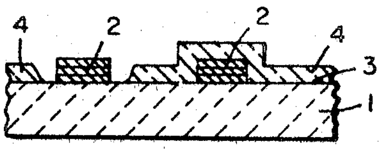
Figure 8:
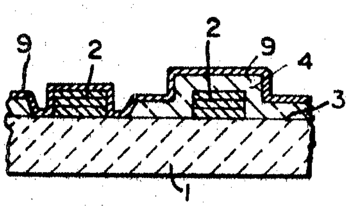
Figure 9:
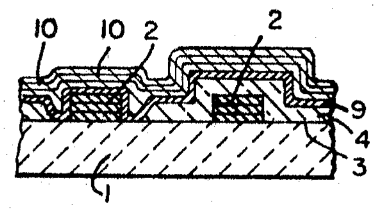
Figure 10:
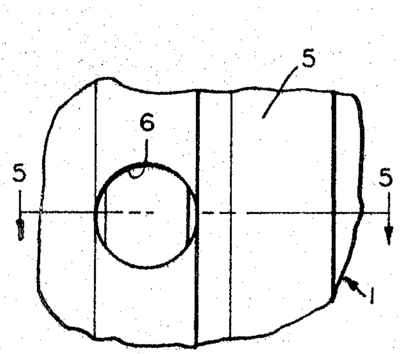
Figure 11:
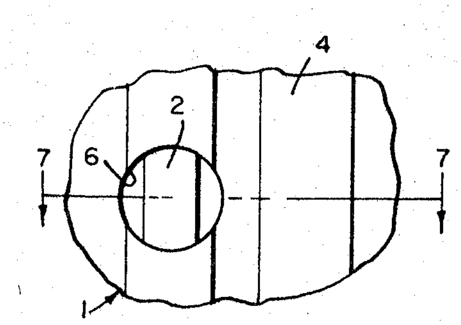
Figure 12:
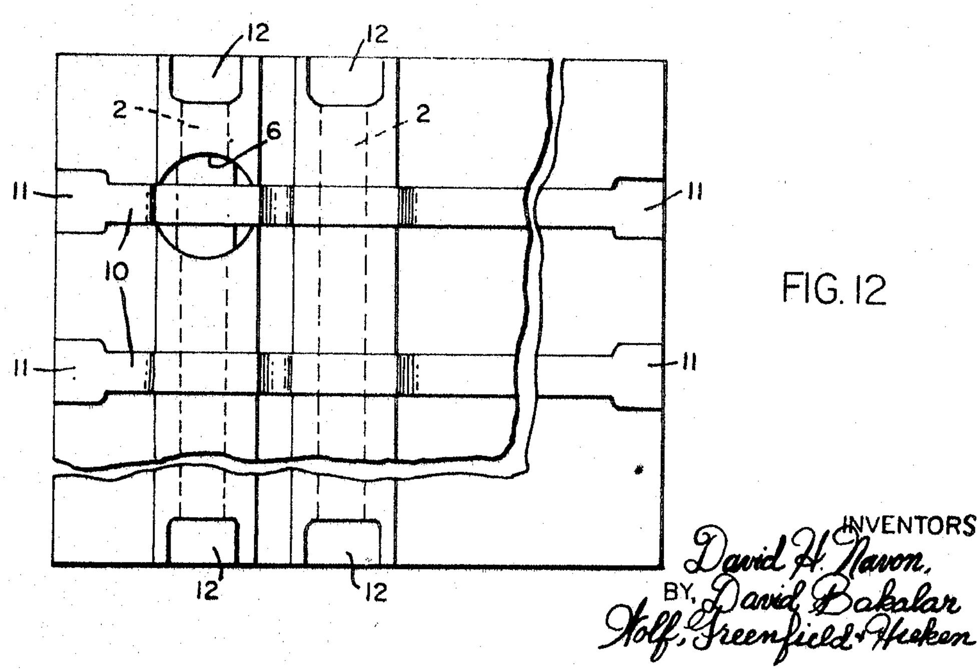

FIGS. 10 and 11 are plan views respectively corresponding to FIGS. 5 and 7, as indicated respectively by the lines 5—5 and 7—7; and FIG. 12 is a fragmentary top plan view of the memory device made in accordance with the present invention.

Referring now to the figures, there is illustrated a method of making a simple capacitor read-only permanent memory device. In the specific embodiment of this invention as illustrated in the accompanying drawings, a dielectric substrate or wafer 1 is formed. This substrate or wafer should be of sufficient mechanical strength to support the conductive members herein described in the course of the normal use of this device in the fixed relation in which they are formed. The substrate or wafer may be formed of any suitable inert ceramic material. In an exemplary batch process for making a multiplicity of memory devices the substrate may have a width and length dimension of 2″ by 2″ and a thickness of approximately .020″.

A plurality of elongated conductive members 2 are formed preferably on one surface 3 of the substrate or ceramic wafer 1. These conductive members are formed preferably of metal strips or bands extending in parallel spaced relation to one another. These strips form either addressing or sensing means and in this particular embodiment, may be deemed to form the sensing means. These conductive members may be formed on the surface 3 by any suitable known technique. Preferably they are formed of copper or nickel and are deposited across the entire face or surface 3 of the ceramic wafer substrate 1 in equally spaced lines or strips about .010" wide with a .020" center to center spacing. The strips or bands preferably cover the entire surface of the wafer 1 and have an overall thickness of preferably about .001". If desired the strips or lines 2 may be deposited by silkscreen techniques, vapor diffusion techniques, bonding or by any other means satisfactory for depositing metal in sufficient thickness to carry the current for which the particular memory device has been designed. If desired, the strips 2 may be deposited in a multiplicity of layers having individual thicknesses of, for example, 1 micron to an overall multilayer metal thickness in the order of .001" in a known manner.

Figure 1:
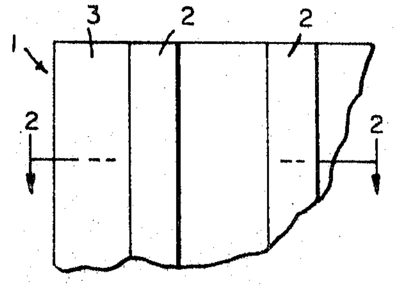
FIG. 1 is a fragmentary enlarged plan view of a wafer partially processed in accordance with the present invention.
Figure 2:
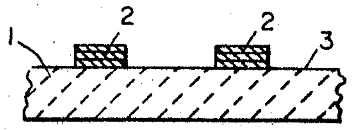
FIG. 2 is a cross-sectional elevation taken along the line 2—2 of FIG. 1.
Figure 3:
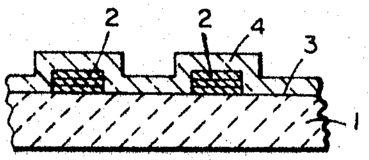
FIGS. 3, 4, 5, 6, 7, 8 and 9 are illustrations of steps in the process in seriatim subsequent to the step illustrated in FIG. 2.

Following the deposition of the strips or bands 2 in the desired thickness, a dielectric material is deposited over the entire surface 3 in a layer 4 of uniform thickness, as illustrated in FIG. 3. This layer 4 is formed of a dielectric material such as silicon dioxide or ground glass or glass particles melted into a sheet covering the surface. If silicon dioxide is used, it may be deposited by well-known techniques as for example by a vapor phase deposition. If desired, silicon oxide may be used in place of silicon dioxide; however, silicon dioxide is preferred as it will etch better than silicon oxide. If a deposition of silicon dioxide is preferred and used an organic silane vapor is exposed to the wafer 1 while oxygen is mixed therewith. Silicon dioxide is then deposited from this vapor phase by decomposition onto the surface of the wafer. This technique of depositing silicon dioxide is preferred as pure silicon dioxide is not very volatile and can only be evaporated at high temperature.

If ground glass or particles are used they may be deposited on the ceramic wafer in a uniform thickness and melted to form a solid integral insulating layer. Such a technique of deposition of a glass layer is known in the semiconductor art. Finely ground glass should be used with particles having a size in the order of one micron or less. These glass particles are suspended in a volatile nonconglomerating medium such as alcohol mixed with ethyl acetate. These glass particles are deposited onto the ceramic wafer 1 by a centrifuge technique which is known in the art.

Figure 4:
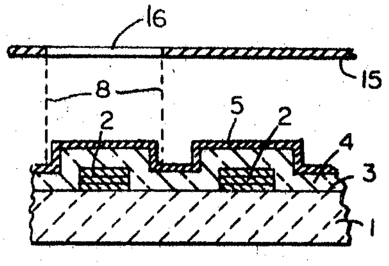

After the layer 4 has been deposited, a conventional photoresist material is applied, preferably over the entire surface of layer 4 in a thin film 5 as illustrated in FIG. 4. The photoresist material may be deposited by well-known techniques.

After deposition of the photoresist film 5, a selected number of holes 6 are opened in the photoresist film 5 at precisely determined and preselected positions over the strips 2, as illustrated in FIGS. 5 and 10. These holes preferably have a diameter of .015" with the hole centers aligned with the center lines of the metallic strips or bands so that the periphery of the holes 6 extend laterally beyond the side edges of the strips 2 over which they are opened. These holes are opened by any suitable well-known technique. For example, if the photoresist material is of the type that is activated by exposing it to light, the entire surface of the film 5 is exposed to light except for the predetermined locations of holes 6. Such a predetermined area over which no light is projected is illustrated in FIG. 4 at 8. After exposure to the light, the wafer is washed in a suitable developer that will remove the non-activated photoresist material but not the activated photoresist. This developer washes away the unexposed portion of the photoresist leaving holes 6.

Alternately, a photoresist may be used of the type in which the activated portion is removed by a developer. If such a photoresist material is used the activated or fixed portions of the photoresist material may be washed or etched away. If this material is used an opaque mask 15 (FIG. 4) having a plurality of predetermined apertures or holes 16 is carefully positioned to cover the film 5 with the holes 16 in alignment with preselected locations or position of the film 5. A light power on the other side of the mask projects light onto the photoresist material and activates limited areas 8 of the photoresist material immediately above the strips 2. The mask is then removed and the wafer 1 is subject to a suitable etch or wash developer capable of removing only the exposed photoresist material. This etch or wash removes the exposed portions of the photoresist material forming the holes 6 without affecting the remaining parts of the unit. The number, shape and size of the holes which are formed and their locations are determined by the parameters of the memory device being formed. Thus, for example, if a memory device having 500 bits of one characteristic is required the mask may have a corresponding number of holes formed in it with these holes positioned on the mask in locations corresponding to the desired locations of the bits on the device being formed. The relative location of these holes in the mask is then transferred to the film and wafer in the manner herein described.

Figure 6:
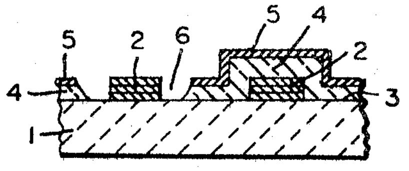

After the holes 6 have been opened in the photoresist film 5, the exposed portions of the layer 4 in the holes are removed by suitable means. This may comprise immersing the wafer in an etching bath consisting of an acid solution of a type commonly available for such purposes. When the exposed portions of the layer 4 have been removed, portions of certain bands or strips 2 are exposed as illustrated in FIG. 6 and in FIG. 7.

Following the removal of the exposed portions of the layer 4, the remainder of the photoresist film may be removed by suitable and known means. This may comprise immersing the wafer in a commonly available photoresist solvent. This step while preferred is optional. After removal of the remainder of the photoresist film, the partially processed device has a configuration as illustrated in FIG. 7.

After the removal of the photoresist film, a thin dielectric layer 9 is deposited over the entire surface of the wafer covering the layer 4 and the exposed portions of strips 2. This layer 9 is preferably formed of a silicon oxide and has a uniform thickness of preferably approximately .1 micron. This extremely thin layer forms a dielectric insulator which will separate the bands or strips 2 from subsequently formed cross-over bands or strips. The dielectric layer 9 may be deposited by any suitable known semiconductor technique for depositing materials such as silicon oxide.

After deposition of the dielectric layer 9, another group or series of bands or strips 10 are laid or deposited across the exposed surface of the dielectric layer 9 in a direction angular to the direction of the bands or strips 2. Preferably, the bands or strips are laid or deposited at right angles to bands or strips 2 to form a lattice network type of arrangement. These bands or strips 10 may be deposited in the same manner and may be of the same dimensions and thickness as the bands or strips 2 deposited on the substrate 1. The strips 10 cross or intersect the strips 2 and form cross-over points at the holes 6 and elsewhere. At the points of crossover, the distances between the adjacent or facing surfaces of the strips 2 and 10 are closer together where holes 6 were formed, and further apart at the cross-over points where no holes were formed. This variation in spacing affects the capacitance of the strip at the cross-over points.

The strips 10 may be formed with enlarged areas or tabs 11 at the edges of the substrate to which they extend and these enlarged areas 11 may be used to facilitate terminal connections of the memory device to the apparatus with which it is being used. Similarly, the strips 2 may be provided with enlarged areas or tabs 12 at the edges of the substrate to which they extend. In the case of the strips 2, the enlarged areas or tabs 12 must be exposed by removal of portions of layer 4 and layer 9. Layer 4 may be removed from an area immediately adjacent to the end tabs 12 at the same time and by the same method that portions of the strips 2 are exposed in the holes 6, as illustrated in FIG. 6. The dielectric layer 9 may, on the other hand, be deposited on all areas of the substrate and layer 4 except in the areas immediately adjacent to and over tabs 12.

In this device, the strips 2 may be deemed as sense lines and the strips 10 address lines. In the specific example herein described, 100 address and 100 sense lines may be provided. These form 10,000 cross-over points and consequently up to 10,000 bits for use as output words. Each intersection between an address line and a sense line thereby constitutes a storage position for one bit. To store a 1 the two lines at the intersection may be arranged to couple capacitively. To store a 0 the capacitance between the lines at the cross-over point is kept as low as possible by not removing dielectric layer 4. A word may be read out by applying a pulse to the appropriate address line thereby causing a voltage to appear in the sense line to which it is coupled. Greater noise protection in capacitive read only memory devices is attained when the difference in capacitance between the "0" and "1" configuration is maximized. And since the preferred embodiment of this invention permits a greater differential in capacitance than heretofore possible, the noise protection is also significantly better. The geometric factors which control the capacitance are the electrode area and dielectric layer thickness at the cross-over points. Increasing the electrode area, as has apparently been attempted (see U.S. Patent 3,183,490 issued May 11, 1965), to maximize capacitance limits the bits of information attainable in a memory matrix per unit area. But in the present invention the dielectric thickness is varied to provide a more significant relative difference between the "0" and "1" capacitance than is possible using electrode area variations. For example, the silicon dioxide layer for the "0" may be made 2 microns thick while the "1" cross-over may be as thin as 0.1 micron. Thus the capacitance ratio may be as great as 20:1. On the other hand, such a differential using variations in electrode area would require unreasonable enlargements of the matrix.

In addition to the foregoing advantages the present invention in its preferred form utilizing thin film dielectric layers permits high capacitances, well above any stray capacitance. Prior art devices are ordinarily incapable of providing such high capacitance as the dielectric layer functions in those cases as a supporting medium and consequently have to be thick in order to provide structural strength.

Well known techniques for hole formation and photoresist processing referred to above are more fully described in a number of available papers, including but not limited to: Atalla, M. M. "Semiconductor Surfaces and Films; $S_i$—$S_iO_2$ Systems," Monograph 3675 Bell Telephone System Technical Publication (August 1959). "Kodak Photosensitive Resists for Industry," Kodak Publication No. P–7. "Application and Processing of the Photo-Resist," Chapter 5—"Etching Techniques," Transistor Technology, vol. III, F. J. Biondi, D. Van Nostrand Co., Inc. (1958).

The construction and method herein described is illustrative only of the invention which may be used in connection with the fabrication and design of more sophisticated memory devices. For example, the invention herein described may be used to form a four-wire system utilizing balancing lines for the purpose of eliminating or improving the electrical characteristics of the lines and the 1:0 ratios, and also to minimize coupling between the sense lines. A device of this nature is described in "Analysis Sneak Paths and Sense-Line Distortion in an Improved Capacitor Read-Only Memory" by D. M. Taub.

The enlarged areas or tabs 11 and 12 are each intrinsically connected to the address or sense lines. These enlarged areas 11 and 12 may be connected to the apparatus with which the memory device is used by securing the enlarged areas 11 and 12 in facing relation to similarly shaped terminals in other apparatus and by clamping or otherwise suitably securing the tabs 11 or 12 in this facing position.

What is claimed is:

1. A memory device comprising a plurality of addressing means,
- a plurality of sensing means supported in spaced juxtaposition to said addressing means,
- with a plurality of discrete capacitive elements formed by selected portions of said addressing means and sensing means, said capacitive elements having dielectric layer of narrower thickness than the spacing between other portions of said addressing and sensing means.

2. A memory device comprising
- a plurality of conductive addressing means,
- a plurality of conductive sensing means,
- dielectric means intermediate said addressing means and sensing means in spaced relation to each other with a plurality of discrete impedance elements formed by selected adjacent portions of said addressing means and sensing means and by variations in the thickness of said dielectric means intermediate said selected adjacent portions.

3. A memory device comprising
- first and second means with each comprising a plurality of elongated conductive members with the members of one means extending in a direction angular to the members of the other means and forming a plurality of cross-over points,
- dielectric means intermediate and spacing said first and second means from each other with portions of said dielectric means at selected ones of said cross-over points thinner than other portions at other cross-over points whereby the capacitance at said selected ones of said cross-over points is greater than the capacitance at said other cross-over points.

4. A memory device as set forth in claim 3 including a base of dielectric material supporting said first and second means.

5. A memory device as set forth in claim 4 wherein said dielectric means comprises a plurality of layers with one layer having apertures therein at said thinner portions of said dielectric means.

6. A memory device as set forth in claim 5 wherein said plurality of layers includes a second layer thinner than and extending across said apertures in said one layer.

7. A memory device as set forth in claim 6 wherein said elongated conductive members are each formed of a plurality of layers of metal formed as strips with the width of each strip substantially greater than the thickness.

8. A memory device as set forth in claim 6 wherein said elongated conductive members of said one means extend from adjacent one side edge of said base toward the opposite side edge, and said elongated conductive members of said other means extend from adjacent third side edge of said base toward the side edge opposite thereto.

9. A memory device as set forth in claim 8 wherein each conductive member is formed with an enlarged integrally formed terminal.

10. A memory device as set forth in claim 9 wherein said terminals are formed on the same side of said base as said conductive members.

11. A memory device as set forth in claim 4, wherein said conductive members of said first means are coplanar with one another at said cross-over points,
- and said conductive members of said second means lie in a plurality of planes at said cross-over points.

12. A memory device as set forth in claim 11 wherein said conductive members of said first means are adjacent said base and intermediate said second means and said base.

13. A memory device comprising a base of dielectric material having a uniform surface, a first means comprising a plurality of flat elongated conductive members extending across and in facing relation to said uniform surface, a second means comprising a plurality of flat elongated conductive members extending angularly with respect to the members of said first means forming a plurality of cross-over points and spaced therefrom by a dielectric means, and said dielectric means intermediate said first and second means and comprising a plurality of layers with one layer of uniform thickness and imperforate at said cross-over points and a second layer integral with said first layer having apertures at selected one of said cross-over points.

14. A method of fabrication a memory device comprising, forming a base layer of dielectric material, depositing on a flat surface of said base layer a first means comprising a plurality of elongated conductive members extending across said surface, depositing a layer of dielectric material of uniform thickness over said first means and the exposed portions of said flat surface, removing portions of said layer of dielectric material of uniform thickness at selected positions to expose selected portions of a plurality of said conductive members, depositing a second layer of dielectric material over said exposed portions of said conductive members, and said layer of dielectric material of uniform thickness to form a dielectric means covering said first means, and depositing a second means on said dielectric means comprising a plurality of elongated conductive members extending in a direction angular to said first means with portions of said conductive members of said second means extending over said selected positions.

15. A method of making a memory device comprising arranging a plurality of metal strips on a base layer of dielectric material, forming a dielectric means over said strips and supported by said base layer, with said dielectric means being formed with a thickness differential at different positions over said strips, and forming a second plurality of metal strips on said dielectric means with said second plurality of metal strips extending angular to said first and forming therewith a plurality of cross-over points at said different positions whereby said different positions will have different capacitances between said strips at said cross-over points.

References Cited

UNITED STATES PATENTS 3,174,134 3/1965 Steinbuch ---------- 340—166

BERNARD KONICK, Primary Examiner

J. F. BREIMAYER, Assistant Examiner

U.S. Cl. X.R.

29—625, 25; 174—68; 317—258; 340—166